US012752515B2

(12) United States Patent
Shochiku

(10) Patent No.: US 12,752,515 B2
(45) Date of Patent: Oct. 6, 2026

(54) METAL-RESIN LAYERED BODY AND METHOD FOR MANUFACTURING METAL-RESIN LAYERED BODY

(71) Applicant: RIMTEC Corporation, Tokyo (JP)

(72) Inventor: Shingo Shochiku, Tokyo (JP)

(73) Assignee: RIMTEC CORPORATION, Tokyo (JP)

( * ) Notice: Subject to any disclaimer, the term of this patent is extended or adjusted under 35 U.S.C. 154(b) by 294 days.

(21) Appl. No.: 18/287,555

(22) PCT Filed: Apr. 25, 2022

(86) PCT No.: PCT/JP2022/018712

§ 371 (c)(1),
(2) Date: Oct. 19, 2023

(87) PCT Pub. No.: WO2022/230803

PCT Pub. Date: Nov. 3, 2022

(65) Prior Publication Data

US 2024/0217211 A1 Jul. 4, 2024

(30) Foreign Application Priority Data

Apr. 30, 2021 (JP) ................................. 2021-077498

(51) Int. Cl.

| | |
|---|---|
| ***B32B 15/085*** | (2006.01) |
| ***B32B 15/20*** | (2006.01) |
| ***B32B 38/00*** | (2006.01) |

(52) U.S. Cl.

CPC ............ *B32B 15/085* (2013.01); *B32B 15/20* (2013.01); *B32B 2038/0076* (2013.01); *B32B 2250/02* (2013.01); *B32B 2311/12* (2013.01); *B32B 2355/00* (2013.01)

(58) Field of Classification Search

None

See application file for complete search history.

(56) References Cited

U.S. PATENT DOCUMENTS

| | | | | |
|---|---|---|---|---|
| 2010/0126796 | A1 | 5/2010 | Kadowaki | |
| 2012/0125514 | A1 | 5/2012 | Wei et al. | |
| 2014/0061955 | A1* | 3/2014 | Shimizu | H10W 74/47 428/447 |
| 2015/0283793 | A1 | 10/2015 | Koizumi et al. | |
| 2019/0299503 | A1 | 10/2019 | Kimura et al. | |
| 2021/0308916 | A1 | 10/2021 | Kimura et al. | |

FOREIGN PATENT DOCUMENTS

| | | | |
|---|---|---|---|
| CN | 101072674 | A | 11/2007 |
| CN | 109195791 | A | 1/2019 |
| CN | 110121532 | A | 8/2019 |
| EP | 1820638 | A1 | 8/2007 |
| JP | 2010-274600 | A | 12/2010 |
| JP | 2013-534054 | A | 8/2013 |
| JP | 2018-103422 | A | 7/2018 |
| JP | 2018-196974 | A | 12/2018 |
| JP | 2019-91742 | A | 6/2019 |
| JP | 2019-181710 | A | 10/2019 |
| JP | 2019-181711 | A | 10/2019 |
| JP | 6806405 | B1 | 1/2021 |
| WO | 03/062253 | A1 | 7/2003 |
| WO | 2011/079799 | A1 | 7/2011 |
| WO | 2014/061521 | A1 | 4/2014 |
| WO | 2021/024956 | A1 | 2/2021 |

OTHER PUBLICATIONS

Extended (supplementary) European Search Report dated Mar. 31, 2025, issued in counterpart EP Application No. 22795716.4. (10 pages).
International Preliminary Report on Patentability (Form PCT/IB/373) issued in counterpart International Application No. PCT/JP2022/018712 dated Oct. 24, 2023, with Form PCT/ISA/237. (6 pages).
International Search Report dated Jul. 12, 2022, issued in counterpart International Application No. PCT/JP2022/018712. (3 pages).

* cited by examiner

*Primary Examiner* — Cheng Yuan Huang

(74) *Attorney, Agent, or Firm* — WHDA, LLP

(57) ABSTRACT

Provided is a metal-resin laminated body in which a metal material and a thermosetting resin are laminated, wherein a shear adhesive strength between the metal material and the thermosetting resin is 10 MPa or more.

5 Claims, No Drawings

METAL-RESIN LAYERED BODY AND METHOD FOR MANUFACTURING METAL-RESIN LAYERED BODY

TECHNICAL FIELD

The present invention relates to a metal-resin laminated body in which a metal material and a thermosetting resin are laminated, and more specifically relates to a metal-resin laminated body comprising a metal material and a thermosetting resin strongly adhering to the surface thereof.

BACKGROUND ART

Techniques of integrally forming a metal material and a resin have been demanded in broad fields such as aircrafts, automobiles, electric home appliances, and industrial apparatuses, and metal-resin laminated bodies in which a metal material and a thermosetting resin are laminated have been examined.

For example, Patent Document 1 discloses a composite of a metal alloy and a molded article of a thermosetting resin composition, wherein the metal alloy has predetermined roughness and ultrafine depressions and projections on its surface and has a thin layer of a metal oxide or a metal phosphate as its surface layer, and the thermosetting resin composition intrudes and cures on the ultrafine depressions and projections on the surface of the metal alloy, so that the metal alloy and the molded article are bonded together without an adhesive.

RELATED ART DOCUMENTS

Patent Documents

Patent Document 1: JP 2010-274600 A

SUMMARY OF THE INVENTION

Problem to be Solved by the Invention

Unfortunately, the present inventor has examined the technique disclosed in Patent Document 1, and has found that there is still room for improvement in the bonding of the metal alloy to the molded article of the thermosetting resin composition. In particular, the present inventor has further examined, and has found that the thin layer of a metal oxide or a metal phosphate present between the metal alloy and the molded article of the thermosetting resin composition causes a reduction in adhesive strength.

The present invention has been made in consideration of such circumstances, and an object of the present invention is to provide a metal-resin laminated body comprising a metal material and a thermosetting resin strongly adhering to the surface thereof, and a method for manufacturing a metal-resin laminated body which can efficiently manufacture such a metal-resin laminated body.

Means for Solving Problems

It is conventionally considered that bonding of a metal to a resin needs a relatively thick oxide layer on the surface of the metal. On the other hand, the present inventor, who has conducted extensive research to achieve the above object, has found that peel-off of a metal-resin laminated body in which a metal material and a thermosetting resin are laminated occurs between such a relatively thick oxide layer and the metal material and that a high adhesive strength is achieved when such a relatively thick oxide layer is absent. These findings have led to completion of the present invention.

Specifically, the present invention provides a metal-resin laminated body in which a metal material and a thermosetting resin are laminated, wherein a shear adhesive strength between the metal material and the thermosetting resin is 10 MPa or more.

In the metal-resin laminated body according to the present invention, preferably, the metal material and the thermosetting resin are laminated by direct adhesion or with an oxide layer interposed therebetween.

In the metal-resin laminated body according to the present invention, preferably, the metal material contains at least one metal selected from the group consisting of copper, nickel, aluminum, chromium, and iron.

In the metal-resin laminated body according to the present invention, preferably, the metal material is copper or a copper alloy.

In the metal-resin laminated body according to the present invention, preferably, the thermosetting resin is a polymer prepared through bulk polymerization of a polymerizable composition containing a norbornene-based monomer.

The metal-resin laminated body according to the present invention may further include a different layer other than layers constituted by the metal material and the thermosetting resin.

The present invention also provides a method for manufacturing a metal-resin laminated body in which a metal material and a thermosetting resin are laminated, the method comprising:

a first step of providing a metal material which has an oxide layer having a thickness of 2 nm or more on a surface thereof and has a center-line average surface roughness Ra of 1.5 nm or more;

a second step of bringing an acid into contact with the metal material provided in the first step; and a third step of bringing a thermosetting resin material into contact with the surface of the metal material brought into contact with the acid in the second step, and curing the thermosetting resin material.

In the method for manufacturing a metal-resin laminated body according to the present invention, preferably, the first step involves a step of subjecting a metal material to gas-phase oxidation or liquid-phase oxidation to obtain the metal material which has an oxide layer having a thickness of 2 nm or more on a surface thereof and has a center-line average surface roughness Ra of 1.5 nm or more.

In the method for manufacturing a metal-resin laminated body according to the present invention, preferably, the metal material contains at least one metal selected from the group consisting of copper, nickel, aluminum, chromium, and iron.

In the method for manufacturing a metal-resin laminated body according to the present invention, preferably, the metal material is copper or a copper alloy.

In the method for manufacturing a metal-resin laminated body according to the present invention, preferably, the thermosetting resin material is a polymerizable composition containing a norbornene-based monomer.

Effects of Invention

The present invention provides a metal-resin laminated body comprising a metal material and a thermosetting resin strongly adhering to the surface thereof, and a method for manufacturing a metal-resin laminated body which can efficiently manufacture such a metal-resin laminated body.

DESCRIPTION OF EMBODIMENTS

<Metal-Resin Laminated Body>

The metal-resin laminated body according to the present invention is a metal-resin laminated body in which a metal material and a thermosetting resin are laminated, wherein the shear adhesive strength between the metal material and the thermosetting resin is 10 MPa or more.

In the metal-resin laminated body according to the present invention, preferably, the metal material and the thermosetting resin are laminated substantially without an oxide layer interposed therebetween, that is, by direct adhesion. The metal material and the thermosetting resin may be laminated with an oxide layer partially or completely interposed therebetween. Specifically, an oxide layer formed by spontaneous oxidation has a thickness of usually about 30 nm although it varies according to the type of the metal material and is not particularly limited. Thus, the thickness of the oxide layer is preferably less than 30 nm, and it is preferably less than 5 nm, more preferably less than 2 nm depending on the type of the metal material. The thickness of the oxide layer can be measured by a method using an X-ray photoelectron spectrometer described later.

The metal material is not particularly limited, and a variety of metal materials such as iron, copper, nickel, gold, silver, platinum, palladium, cobalt, zinc, lead, tin, titanium, chromium, aluminum, magnesium, manganese, and alloys thereof can be used. Preferred are those containing at least one metal selected from the group consisting of copper, nickel, aluminum, chromium, and iron. Among these, more preferred is copper, a copper alloy, aluminum, or an iron alloy (stainless steel), still more preferred is copper or a copper alloy, and particularly preferred is copper. The copper is particularly preferably copper having high purity (e.g., a purity of 95% by mass or more, preferably a purity of 99% by mass or more, more preferably a purity of 99.9% by mass or more) such as tough-pitch copper or oxygen-free copper. Examples of copper alloys include brass, phosphor bronze, nickel silver, aluminum bronze, and the like, and cover all the copper alloys specified in Japanese Industrial Standards (JIS H 3000 series) such as pure copper-based alloys such as C1020 and C1100, C2600-series brass alloys, C5600-series cupronickel-based alloys, other iron-based copper alloys for connectors, and the like.

Although the shape of the metal material is not particularly limited, preferred are those in the form of a plate or a thin film because a laminated body with the thermosetting resin can be favorably formed. When the metal material is in the form of a plate or a thin film, the thickness is preferably 0.001 to 100 mm, more preferably 0.1 to 50 mm, particularly preferably 0.5 to 40 mm.

The metal material may be a metal foil, or may be a substrate such as a substrate for manufacturing a printed circuit board, or may be a terminal electrode for a variety of electronic parts. In particular, when the metal material is a terminal electrode for a variety of electronic parts and a thermosetting resin is laminated thereon, the thermosetting resin can be used as a sealing material.

Examples of the thermosetting resin include, but should not be limited to, norbornene-based resins, unsaturated polyester resins, acrylic resins, vinyl ester resins, alkyd resins, amino resins, epoxy resins, urethane resins, phenol resins, silicone resins, and the like. Among these, preferred are norbornene-based resins and epoxy resins, and preferred are norbornene-based resins because these can have further enhanced adhesive strength to the metal material.

In the norbornene-based resins, a polymerizable composition containing a norbornene-based monomer can be suitably used as a thermosetting resin material for forming a norbornene-based resin (thermosetting resin), and a norbornene-based resin (thermosetting resin) as a cured product can be suitably obtained by bulk polymerizing such a polymerizable composition containing a norbornene-based monomer.

The norbornene-based monomer can be any compound having a norbornene ring structure, and is not particularly limited. Examples thereof include bicyclic compounds such as norbornene and norbornadiene; tricyclic compounds such as dicyclopentadiene; tetracyclic compounds such as tetracyclododecene; pentacyclic compounds such as tricyclopentadiene; heptacyclic compounds such as tetracyclopentadiene; derivatives thereof having a $C_2$ to $C_{10}$ alkenyl group, a $C_2$ to $C_{10}$ alkynyl group, a $C_1$ to $C_{10}$ alkylidene group, an epoxy group, or an (meth) acrylic group; and the like. These norbornene-based monomers can be used alone or in combination. As the norbornene-based monomer, preferred are the tricyclic compounds, and particularly preferred is dicyclopentadiene because they can further enhance the effects of the present invention. The norbornene-based monomer to be used preferably contains the tricyclic compounds, especially dicyclopentadiene in a proportion of 50% by mass or more.

The polymerizable composition used in the present invention can contain the norbornene-based monomer in any proportion. The content thereof is preferably 50% by mass or more, more preferably 60% by mass or more, still more preferably 70% by mass or more in 100% by mass of the total polymerizable monomers contained in the polymerizable composition, and may be 100% by mass. By controlling the content of the norbornene-based monomer within these ranges, a norbornene-based resin prepared from the polymerizable composition according to the present invention can have further enhanced adhesive strength to the metal material.

In the present invention, a monocyclic cycloolefin may be further used as a polymerizable monomer contained in the polymerizable composition.

Examples of monocyclic cycloolefins include, but should not be limited to, cyclobutene, cyclopentene, cyclohexene, cyclooctene, cyclododecene, cyclopentadiene, 1,4-cyclohexadiene, 1,5-cyclooctadiene, derivatives thereof having a $C_2$ to $C_{10}$ alkenyl group, a $C_2$ to $C_{10}$ alkynyl group, a $C_1$ to $C_{10}$ alkylidene group, an epoxy group, or an (meth) acrylic group, and the like. These monocyclic cycloolefins can be used alone or in combination.

Besides the norbornene-based monomer and the monocyclic cycloolefin, the polymerizable composition used in the present invention may also contain a different polymerizable monomer polymerizable therewith. Examples of such different polymerizable monomers include other cycloolefin monomers, (meth) acrylate monomers such as phenoxymethylene glycol (meth) acrylate; and the like. The (meth) acrylate monomers can function as an adhesive aid for bonding the metal material to the norbornene-based resin. In this specification, (meth) acrylate means methacrylate or acrylate.

In the polymerizable composition used in the present invention, the content of the different polymerizable monomer other than the norbornene-based monomer is not particularly limited, and is preferably 50% by mass or less, more preferably 40% by mass or less, still more preferably 30% by mass or less in 100% by mass of the total polymerizable monomers contained in the polymerizable composition, and may be 0% by mass.

In the polymerizable composition used in the present invention, the total content of the polymerizable monomers is preferably 10 to 95% by mass, more preferably 15 to 93% by mass, still more preferably 20 to 90% by mass in 100% by mass of the entire polymerizable composition.

The polymerizable composition used in the present invention preferably contains a metathesis polymerization catalyst as a polymerization catalyst. The metathesis polymerization catalyst can be any metathesis polymerization catalyst as long as it can ring-opening polymerize the norbornene-based monomer, and known metathesis polymerization catalysts can be used.

The metathesis polymerization catalyst used in the present invention is a complex having a transition metal atom as a central atom to which a plurality of ions, atoms, polyatomic ions, and/or compounds are bonded. As the transition metal atom, atoms of Groups 5, 6, and 8 (Long Periodic Table, hereinafter, the same is applied) are used. Although there is no particular limitation to the atoms of the respective groups, examples of atoms of Group 5 include tantalum, examples of atom of Group 6 include molybdenum and tungsten, and examples of atoms of Group 8 include ruthenium and osmium. Among these transition metal atoms, preferred are ruthenium and osmium of Group 8. That is, the metathesis polymerization catalyst used in the present invention is preferably a complex having ruthenium or osmium as the central atom, more preferably a complex having ruthenium as the central atom. The complex having ruthenium as the central atom is preferably a ruthenium carbene complex in which a carbene compound is coordinated with ruthenium. Here, the "carbene compound" is a generic name for a compound having a methylene free radical, and refers to a compound having an uncharged divalent carbon atom (carbene carbon) represented by (>C:). Because the ruthenium carbene complex has high catalytic activity during bulk ring-opening polymerization, a high-quality polymer having a low odor derived from unreacted monomers is prepared with high productivity. The ruthenium carbene complex, which is relatively stable to oxygen or moisture in the air and is hardly deactivated, can be used under the air. These metathesis polymerization catalysts may be used alone or in combination.

Examples of the ruthenium carbene complex include those represented by General Formula (1) or (2):

[Chem. 1]

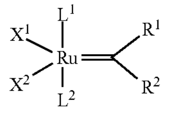

(1)

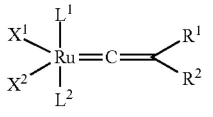

(2)

In General Formulae (1) and (2) above, $R^1$ and $R^2$ each independently represent a hydrogen atom; a halogen atom; or a $C_1$ to $C_{20}$ organic group which may contain a halogen atom, an oxygen atom, a nitrogen atom, a sulfur atom, a phosphorus atom, or a silicon atom; and these groups may be substituted, or may be bonded to each other to form a ring. Examples of $R^1$ and $R^2$ bonded to each other to form a ring include indenylidenes which may be substituted, such as a phenylindenylidene group.

Specific examples of $C_1$ to $C_{20}$ organic groups which may contain a halogen atom, an oxygen atom, a nitrogen atom, a sulfur atom, a phosphorus atom, or a silicon atom include $C_1$ to $C_{20}$ alkyl groups, $C_2$ to $C_{20}$ alkenyl groups, $C_2$ to $C_{20}$ alkynyl groups, $C_6$ to $C_{20}$ aryl groups, $C_1$ to $C_{20}$) alkoxy groups, $C_2$ to $C_{20}$ alkenyloxy groups, $C_2$ to $C_{20}$ alkynyloxy groups, $C_6$ to $C_2$ aryloxy groups, $C_1$ to $C_6$ alkylthio groups, a carbonyloxy group, $C_1$ to $C_{25}$ alkoxycarbonyl groups, $C_1$ to $C_{20}$ alkylsulfonyl groups, $C_1$ to $C_{20}$ alkylsulfinyl groups, $C_1$ to $C_{20}$ alkylsulfonic acid groups, $C_6$ to $C_{20}$ arylsulfonic acid groups, a phosphonic acid group, $C_6$ to $C_2$ arylphosphonyl acid groups, $C_1$ to $C_6$ alkylammonium groups, $C_6$ to $C_{20}$ acylammonium groups, and the like. These $C_1$ to $C_6$ organic groups which may contain a halogen atom, an oxygen atom, a nitrogen atom, a sulfur atom, a phosphorus atom, or a silicon atom may be substituted. Examples of substituents include $C_1$ to $C_{10}$ alkyl groups, $C_1$ to $C_6$ alkoxy groups, $C_6$ to $C_{10}$ aryl groups, and the like.

$X^1$ and $X^2$ each independently represent any anionic ligand. The anionic ligand is a ligand having a negative charge when separated from a central metal atom, and examples thereof include halogen atoms, diketonates groups, substituted cyclopentadienyl groups, alkoxyl groups, aryloxy groups, a carboxyl group, and the like.

$L^1$ and $L^2$ represent a heteroatom-containing carbene compound or a neutral electron-donating compound other than the heteroatom-containing carbene compound. The heteroatom-containing carbene compound and the neutral electron-donating compound other than the heteroatom-containing carbene compound are compounds having a neutral charge when separated from the central metal. To improve catalytic activity, preferred are heteroatom-containing carbene compounds. The heteroatom indicates atoms of Groups 15 and 16 in the Periodic Table, and specifically examples thereof include a nitrogen atom, an oxygen atom, a phosphorus atom, a sulfur atom, an arsenic atom, a selenium atom, and the like. Among these, preferred are a nitrogen atom, an oxygen atom, a phosphorus atom, and a sulfur atom, and more preferred is a nitrogen atom to obtain a stable carbene compound.

The heteroatom-containing carbene compound is preferably a compound represented by General Formula (3) or (4) below. To improve catalytic activity, more preferred is a compound represented by General Formula (3) below:

[Chem. 2]

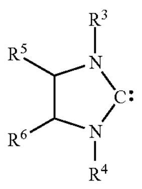

(3)

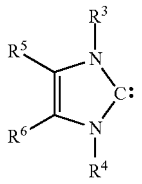

(4)

In General Formulae (3) and (4) above, $R^3$, $R^4$, $R^5$, and $R^6$ each independently represent a hydrogen atom; a halogen atom; or a $C_1$ to $C_{20}$ organic group which may contain a halogen atom, an oxygen atom, a nitrogen atom, a sulfur atom, a phosphorus atom, or a silicon atom. Specific examples of the $C_1$ to $C_{20}$ organic group which may contain a halogen atom, an oxygen atom, a nitrogen atom, a sulfur atom, a phosphorus atom, or a silicon atom are the same as those listed in General Formulae (1) and (2).

$R^3$, $R^4$, $R^5$, and $R^6$ may also bonded to each other in any combination to form a ring.

Since the effects of the present invention become more prominent, $R^5$ and $R^6$ are preferably a hydrogen atom. $R^3$ and $R^4$ are preferably an aryl group which may be substituted, more preferably a phenyl group having a $C_1$ to $C_6$ alkyl group as a substituent, still more preferably a mesityl group.

Examples of the neutral electron-donating compound include an oxygen atom, water, carbonyls, ethers, nitriles, esters, phosphines, phosphinates, phosphites, sulfoxides, thioethers, amides, imines, aromatics, cyclic diolefins, olefins, isocyanides, thiocyanates, and the like.

In General Formulae (1) and (2) above, $R^1$, $R^2$, $X^1$, $x^2$, $L^1$, and $L^2$ may stand alone, and/or may be bonded to each other in any combination to form a multidentate chelating ligand.

Among these compounds represented by General Formula (1) or (2) above, preferred are compounds represented by General Formula (1) above as the ruthenium carbene complex used in the present invention because the effects of the present invention become more prominent. Among these, more preferred are compounds represented by General Formula (5) or (6) below.

General Formula (5) is shown below:

[Chem. 3]

(5)

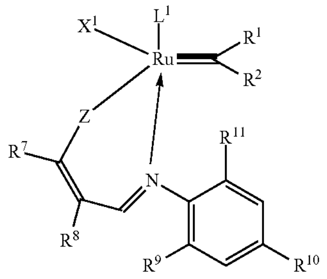

In General Formula (5), Z is an oxygen atom, a sulfur atom, a selenium atom, $NR^{12}$, $PR^{12}$, or $AsR^{12}$, and $R^{12}$ is a hydrogen atom; a halogen atom; or a $C_1$ to $C_{20}$ organic group which may contain a halogen atom, an oxygen atom, a nitrogen atom, a sulfur atom, a phosphorus atom, or a silicon atom. Since the effects of the present invention become more prominent, Z is preferably an oxygen atom.

$R^1$, $R^2$, $X^1$, and $L^1$ are the same as those in General Formulae (1) and (2) above, and may stand alone and/or may be bonded to each other in any combination to form a multidentate chelating ligand. It is preferred that $X^1$ and $L^1$ do not form a multidentate chelating ligand and $R^1$ and $R^2$ be bonded to each other to form a ring, which is more preferably an indenylidene group which may be substituted, still more preferably a phenylindenylidene group.

Specific examples of the $C_1$ to $C_6$ organic group which may contain a halogen atom, an oxygen atom, a nitrogen atom, a sulfur atom, a phosphorus atom, or a silicon atom are the same as those in General Formulae (1) and (2) above.

In General Formula (5) above, $R^7$ and $R^8$ are each independently a hydrogen atom, a $C_1$ to $C_{20}$ alkyl group, a $C_2$ to $C_{20}$ alkenyl group, or a $C_6$ to Cap heteroaryl group. These groups may be substituted, or may be bonded to each other to form a ring. Examples of substituents include $C_1$ to $C_6$ alkyl groups, $C_1$ to $C_{10}$ alkoxy groups, and $C_6$ to $C_{10}$ aryl groups. Although the ring when it is formed by $R^7$ and $R^8$ may be any one of an aromatic ring, an alicyclic ring, and a heterocyclic ring, $R^7$ and $R^8$ preferably form an aromatic ring, more preferably form a $C_6$ to $C_{20}$ aromatic ring, still more preferably a $C_6$ to $C_{10}$ aromatic ring.

In General Formula (5) above, $R^9$, $R^{10}$, and $R^{11}$ are each independently a hydrogen atom; a halogen atom; or a $C_1$ to $C_{20}$ organic group which may contain a halogen atom, an oxygen atom, a nitrogen atom, a sulfur atom, a phosphorus atom, or a silicon atom. These groups may be substituted, or may be bonded to each other to form a ring. Specific examples of the $C_1$ to $C_{20}$ organic group which may contain a halogen atom, an oxygen atom, a nitrogen atom, a sulfur atom, a phosphorus atom, or a silicon atom are the same as those in General Formulae (1) and (2) above.

$R^9$, $R^{10}$, and $R^{11}$ are preferably a hydrogen atom or a $C_1$ to $C_{20}$ alkyl group, more preferably a hydrogen atom or a $C_1$ to $C_3$ alkyl group.

Specific examples of the compound represented by General Formula (5) above and the method of producing the same include those described in WO 03/062253 (JP 2005-515260 T).

General Formula (6) is shown below:

[Chem. 4]

(6)

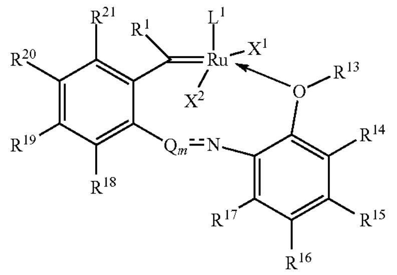

In General Formula (6) above, m is 0 or 1. m is preferably 1, and in this case, Q is an oxygen atom, a nitrogen atom, a sulfur atom, a methylene group, an ethylene group, or a carbonyl group, preferably a methylene group.

In General Formula (6) above,

[Chem. 5]

is a single bond or a double bond, preferably a single bond.

$R^1$, $X^1$, $X^2$, and $L^1$ are the same as those in General Formulae (1) and (2) above, and may stand alone and/or may be bonded to each other in any combination to form a multidentate chelating ligand. Preferably, $X^1$, $x^2$, and Il do not form a multidentate chelating ligand, and $R^1$ is a hydrogen atom.

$R^{13}$ to $R^{21}$ are a hydrogen atom; a halogen atom; or a $C_1$ to $C_{20}$) organic group which may contain a halogen atom, an oxygen atom, a nitrogen atom, a sulfur atom, a phosphorus atom, or a silicon atom. These groups may be substituted, or may be bonded to each other to form a ring. Specific examples of the $C_1$ to $C_{20}$ organic group which may contain a halogen atom, an oxygen atom, a nitrogen atom, a sulfur atom, a phosphorus atom, or a silicon atom are the same as those in General Formulae (1) and (2) above.

$R^{13}$ is preferably a $C_1$ to $C_{20}$ alkyl group, more preferably a $C_1$ to $C_3$ alkyl group. $R^{14}$ to $R^{17}$ are preferably a hydrogen atom, and $R^{18}$ to $R^{21}$ are preferably a hydrogen atom or a halogen atom.

Specific examples of the compound represented by General Formula (6) above and a method for producing the same include those described in WO 11/079799 (JP 2013-516392 T).

The content of the metathesis polymerization catalyst is preferably 0.005 mmol or more, more preferably 0.01 to 50 mmol, still more preferably 0.015 to 20 mmol relative to 1 mol of the total polymerizable monomers used in the reaction.

The polymerizable composition used in the present invention may contain a radical generator, a diisocyanate compound, a polyfunctional (meth) acrylate compound, a coupling agent, and other optional components as desired.

The radical generator, when heated, generates radicals, by which the radical generator induces a cross-linking reaction in a norbornene-based resin formed through bulk polymerization. The sites at which the radical generator induces the cross-linking reaction are mainly carbon-carbon double bonds contained in the norbornene-based resin while saturated bonds may also be cross-linked in some cases. Examples of the radical generator include organic peroxides, diazo compounds, and nonpolar radical generators.

The amount of the radical generator in the polymerizable composition used in the present invention is preferably 0.1 to 10 parts by mass, more preferably 0.5 to 5 parts by mass relative to 100 parts by mass of the total amount of the polymerizable monomers used in the reaction.

Examples of the diisocyanate compounds include aromatic diisocyanate compounds such as methylenediphenyl 4,4'-diisocyanate (MDI), toluene-2,4-diisocyanate, 4-methoxy-1,3-phenylene diisocyanate, 4-isopropyl-1,3-phenylene diisocyanate, 4-chloro-1,3-phenylene diisocyanate, 4-butoxy-1,3-phenylene diisocyanate, 2,4-diisocyanate diphenyl ether, 1,4-phenylene diisocyanate, tolylene diisocyanate, xylylene diisocyanate (XDI), 1,5-naphthalene diisocyanate, benzidine diisocyanate, o-nitrobenzidine diisocyanate, and dibenzyl 4,4'-diisocyanate; aliphatic diisocyanate compounds such as methylene diisocyanate, 1,4-tetramethylene diisocyanate, 1,6-hexamethylene diisocyanate, and 1,10-decamethylene diisocyanate; alicyclic diisocyanate compounds such as 4-cyclohexylene diisocyanate, 4,4'-methylene bis (cyclohexyl isocyanate), 1,5-tetrahydronaphthalene diisocyanate, isophorone diisocyanate, hydrogenated MDI, and hydrogenated XDI; polyurethane prepolymers terminated with isocyanate, which are prepared by reacting these diisocyanate compounds with a low molecular weight polyol or polyamine; and the like. In addition, known isocyanurate forms, biuret forms, adduct forms, or polymeric forms of these compounds, which have a polyfunctional isocyanate group and are conventionally used, can be used without limitation. Examples thereof include dimers of 2,4-toluylene diisocyanate, triphenylmethane triisocyanate, tris-(p-isocyanate phenyl) thiophosphite, polyfunctional aromatic isocyanate compounds, polyfunctional aromatic aliphatic isocyanate compounds, polyfunctional aliphatic isocyanate compounds, fatty acid-modified polyfunctional aliphatic isocyanate compounds, block-type polyfunctional isocyanate compounds such as blocked polyfunctional aliphatic isocyanate compounds, polyisocyanate prepolymers, and the like. Among these, suitably used are aromatic diisocyanate compounds, aliphatic diisocyanate compounds, and alicyclic diisocyanate compounds, which are non-block-type polyfunctional isocyanate compounds, because of their availability and ease in handling.

These compounds can be used alone or in combination.

The block-type polyfunctional isocyanate compound indicates an isocyanate compound having at least two isocyanate groups in the molecule which are inactivated at normal temperature through a reaction with an active hydrogen-containing compound. The isocyanate compound usually has a structure having isocyanate groups masked with a blocking agent, examples of the blocking agent including alcohols, phenols, ε-caprolactam, oximes, and active methylene compounds, and the like. The block-type polyfunctional isocyanate compound is usually not reactive at normal temperature, leading to high storage stability, while it exhibits its high reactivity due to the isocyanate groups regenerated when heated usually at 140 to 200° C.

These diisocyanate compounds may be used alone or in combination. The compounding amount of the diisocyanate compound in the polymerizable composition used in the present invention is preferably 0.5 to 20 parts by mass, more preferably 1 to 15 parts by mass, still more preferably 2 to 10 parts by mass relative to 100 parts by mass of the total amount of the polymerizable monomers used in the reaction.

To further improve the adhesive strength to the metal material, a polyfunctional (meth) acrylate compound may be used. It is inferred that when the polyfunctional (meth) acrylate compound is used in combination with the diisocyanate compound, the diisocyanate compound forms chemical bonds between its active hydrogen reactive groups and hydroxyl groups present in the polyfunctional (meth) acrylate compound, and as a result, the adhesive strength to the metal material can be further enhanced. Preferred examples of the polyfunctional (meth) acrylate compound include ethylene glycol dimethacrylate, triethylene glycol dimethacrylate, trimethylolpropane trimethacrylate, and neopentyl glycol dimethacrylate.

These polyfunctional (meth) acrylate compounds may be used alone or in combination. The compounding amount of the polyfunctional (meth) acrylate compound in the polymerizable composition is preferably 0.5 to 20 parts by mass, more preferably 1 to 15 parts by mass, still more preferably 2 to 10 parts by mass relative to 100 parts by mass of the total polymerizable monomers used in the reaction.

Although the coupling agent is not particularly limited, preferred are silane coupling agents having at least one hydrocarbon group having a norbornene structure (norbornene skeleton) to improve the adhesive properties between the metal material and the norbornene-based resin. Specific examples of such silane coupling agents include bicycloheptenyltrimethoxysilane, bicycloheptenyltriethoxysilane, bicycloheptenylethyltrimethoxysilane, bicycloheptenylethyltriethoxysilane, bicycloheptenylhexyltrimethoxysilane, bicycloheptenylhexyltriethoxysilane, and the like. Preferred are bicycloheptenylethyltrimethoxysilane, bicycloheptenylethyltriethoxysilane, bicycloheptenylhexyltrimethoxysilane, and bicycloheptenylhexyltriethoxysilane, more preferred are bicycloheptenylethyltrimethoxysilane and bicycloheptenylethyltriethoxysilane, and still more preferred is bicycloheptenylethyltrimethoxysilane.

The content of the silane coupling agent having at least one hydrocarbon group having a norbornene structure in the polymerizable composition used in the present invention is preferably 0.1 to 5% by mass, more preferably 0.3 to 2% by mass, still more preferably 0.5 to 1% by mass.

The polymerizable composition may also contain a silane coupling agent without a hydrocarbon group having a norbornene structure, and coupling agents other than the silane coupling agents, such as thiol coupling agents, aluminate coupling agents, titanate coupling agents, and fatty acid esters.

Examples of other optional components include activating agents, activity regulators, elastomers, antioxidants (anti-aging agents), colorants, light stabilizers, flame retardants, and the like.

The activating agent is a compound which acts as a cocatalyst for the above-mentioned metathesis polymerization catalyst to improve the polymerization activity of the catalyst. Examples of activating agents to be used include alkylaluminum halides such as ethylaluminum dichloride and diethylaluminum chloride; alkoxyalkylaluminum halides prepared by substituting part of alkyl groups in these alkylaluminum halides with alkoxy groups; organic tin compounds; and the like. The activating agent can be used in any amount, and the amount is preferably 0.1 to 100 mol, more preferably 1 to 10 mol relative to 1 mol of the total metathesis polymerization catalysts used in the polymerizable composition.

As described later, when two or more reaction stock solutions are mixed to prepare a polymerizable composition, the polymerization composition is injected into a mold, and polymerization is initiated, the activity regulator is used to prevent the polymerization from starting during the injection.

When a compound of a transition metal in Group 5 or 6 in the Periodic Table is used as the metathesis polymerization catalyst, examples of activity regulators include compounds having action to reduce the metathesis polymerization catalyst. Alcohols, haloalcohols, esters, ethers, nitriles, and the like can be used. Among these, preferred are alcohols and haloalcohols, and more preferred is haloalcohols.

Specific examples of alcohols include n-propanol, n-butanol, n-hexanol, 2-butanol, isobutyl alcohol, isopropyl alcohol, t-butyl alcohol, and the like. Specific examples of haloalcohols include 1,3-dichloro-2-propanol, 2-chloroethanol, 1-chlorobutanol, and the like.

In particular, when a ruthenium carbene complex is used as the metathesis polymerization catalyst, examples of the activity regulator include Lewis base compounds. Examples of Lewis base compounds include Lewis base compounds containing a phosphorus atom, such as tricyclopentylphosphine, tricyclohexylphosphine, triphenylphosphine, triphenyl phosphite, and n-butylphosphine; Lewis base compounds containing a nitrogen atom, such as n-butylamine, pyridine, 4-vinylpyridine, acetonitrile, ethylenediamine, N-benzylidenemethylamine, pyrazine, piperidine, and imidazole; and the like. In addition, norbornenes substituted by an alkenyl group, such as vinyl norbornene, propenyl norbornene, and isopropenyl norbornene, are the polymerizable monomers, and also act as the activity regulator. The amount of these activity regulators to be used may be appropriately adjusted depending on the compound to be used.

Examples of elastomers include natural rubber, polybutadiene, polyisoprene, styrene-butadiene copolymers (SBR), styrene-butadiene-styrene copolymers (SBS), styrene-isoprene-styrene copolymers (SIS), ethylene-propylene-diene terpolymers (EPDM), ethylene-vinyl acetate copolymers (EVA), hydrides thereof, and the like. The viscosity of the elastomer can be adjusted for use by dissolving the elastomer in the polymerizable composition. By adding the elastomer, a norbornene-based resin having improved impact resistance can be formed through bulk polymerization of the composition. The amount of the elastomer to be used is preferably 0.5 to 20 parts by mass, more preferably 2 to 10 parts by mass relative to 100 parts by mass of the total polymerizable monomers in the polymerizable composition.

Examples of antioxidants (anti-aging agents) include a variety of antioxidants for plastics and rubber, such as phenol antioxidants, phosphorus antioxidants, amine antioxidants, and the like. As the dispersant, anionic surfactants, cationic surfactants, and nonionic surfactants can be optionally used. Preferred are nonionic surfactants.

The colorants to be used are dyes, pigments, and the like. The dyes have a huge variety, and known one may be appropriately selected for use. Examples of pigments include carbon black, graphite, chrome yellow, iron oxide yellow, titanium dioxide, zinc oxide, trilead tetraoxide, red lead oxide, chromium oxide, Prussian blue, titanium black, and the like.

Examples of light stabilizers include benzotriazole-based ultraviolet absorbing agents, benzophenone-based ultraviolet absorbing agents, salicylate-based ultraviolet absorbing agents, cyano acrylate-based ultraviolet absorbing agents, oxanilides-based ultraviolet absorbing agents, hindered amine-based ultraviolet absorbing agents, benzoate-based ultraviolet absorbing agents, and the like.

Examples of flame retardants include phosphorus-based flame retardants, nitrogen-based flame retardants, halogen-based flame retardants, metal hydroxide-based flame retardants such as aluminum hydroxide and magnesium hydroxide, and the like.

The polymerizable composition used in the present invention may contain a filler as an optional component. A variety of fillers can be used as the filler without limitation. Preferred is use of an inorganic filler composed of a fibrous filler having an aspect ratio of 5 to 100 or a particulate filler having an aspect ratio of 1 to 2. The aspect ratio of the filler indicates the ratio of the average major axis diameter of the filler to the 50% volume cumulative diameter thereof. Here, the average major axis diameter indicates the number average major axis diameter obtained by measuring the lengths of 100 fillers selected at random in an optical microscope image and calculating the arithmetic average value of the lengths. The 50% volume cumulative diameter indicates a value determined by measuring the particle size distribution by an X-ray transmission method. The surface of the filler is preferably subjected to hydrophobization treatment. In the metal-resin laminated body according to the present invention, from the viewpoint of increasing the adhesive strength to the metal material, preferably, the thermosetting resin does not contain a filler. Thus, preferably, the polymerizable composition used in the present invention does not contain a filler.

When the polymerizable composition used in the present invention contains the filler, the amount of the filler is preferably 5 to 55 parts by mass, more preferably 10 to 45 parts by mass relative to 100 parts by mass of the total amount of the norbornene-based monomer and the metathesis polymerization catalyst.

The polymerizable composition used in the present invention is prepared by appropriately mixing the above-mentioned components according to a known method. The polymerizable composition used in the present invention may be prepared by preparing two or more preparative liquid formulations, and mixing the two or more preparative liquid formulations with a mixing apparatus immediately before bulk polymerization to form a norbornene-based resin. For the preparative liquid formulations, the above-mentioned components are distributed and prepared into two or more solutions such that each of them alone is not capable of bulk polymerization, and when all the solutions are mixed, they can form the polymerizable composition containing the above-mentioned components in predetermined proportions (where the total content of the components is 100% by mass). Examples of a combination of such two or more reaction stock solutions include two combinations (a) and (b) below depending on the type of the metathesis polymerization catalyst used.

(a): The metathesis polymerization catalyst to be used can be a metathesis polymerization catalyst which alone has no polymerization reaction activity while exhibiting polymerization reaction activity when used in combination with the activating agent. In this case, a preparative liquid formulation (solution A) containing the polymerizable monomer containing the norbornene-based monomer and the activating agent, and a preparative liquid formulation (solution B) containing the polymerizable monomer containing the norbornene-based monomer and the metathesis polymerization catalyst are used, and the polymerizable composition can be prepared by mixing these. Furthermore, a preparative liquid formulation (solution C) containing the polymerizable monomer containing the norbornene-based monomer but not any of the metathesis polymerization catalyst and the activating agent may be used in combination.

(b): When a metathesis polymerization catalyst which alone has polymerization reaction activity is used, the polymerizable composition can be prepared by mixing a preparative liquid formulation (i) containing the polymerizable monomer containing the norbornene-based monomer and a preparative liquid formulation (ii) containing the metathesis polymerization catalyst. At this time, the preparative liquid formulation (ii) to be used is usually in the form of a solution or dispersion of the metathesis polymerization catalyst in a small amount of an inert solvent. Examples of such a solvent include aromatic hydrocarbons such as toluene, xylene, ethylbenzene, and trimethylbenzene; ketones such as methyl ethyl ketone, cyclopentanone, cyclohexanone, 2-heptanone, and 4-hydroxy-4-methyl-2-pentanone; cyclic ethers such as tetrahydrofuran; diethyl ether, dichloromethane, dimethyl sulfoxide, ethyl acetate, and the like.

The optional components such as the radical generator, the diisocyanate compound, and the polyfunctional (meth) acrylate compound may be contained in any one of the preparative liquid formulations, or may be added in the form of a mixed solution other than the preparative liquid formulations.

Examples of the mixing apparatus used in mixing of the preparative liquid formulations above include collision mixing apparatuses usually used in reaction injection molding, low pressure mixers such as dynamic mixers and static mixers, and the like.

In the metal-resin laminated body according to the present invention, the shear adhesive strength between the metal material and the thermosetting resin is 10 MPa or more. In the present invention, when the shear adhesive strength between the metal material and the thermosetting resin is 10 MPa or more, the thermosetting resin can strongly adhere to the surface of the metal material. Examples of the method of controlling the shear adhesive strength between the metal material and the thermosetting resin to 10 MPa or more include, but should not be limited to, a method for manufacturing a metal-resin laminated body by the method for manufacturing a metal-resin laminated body according to the present invention (described later), and the like.

In the metal-resin laminated body according to the present invention, the shear adhesive strength between the metal material and the thermosetting resin is 10 MPa or more, and is preferably 20 MPa or more, more preferably 30 MPa or more. The upper limit of the shear adhesive strength, although not particularly limited, is usually 35 MPa or less.

In the present invention, the shear adhesive strength between the metal material and the thermosetting resin can be measured in accordance with SEMI G69-0996. Specifically, the shear adhesive strength of the metal-resin laminated body in which the metal material and the thermosetting resin are laminated (metal-resin laminated body in which the thermosetting resin is laminated on part of the surface of the metal material) can be measured using an adhesive strength evaluation apparatus (bondtester) (SS30WD, available from Seishin Trading Co., Ltd.) at a shear rate (rate when a shear is applied by moving a shear tool toward the thermosetting resin) of 0.12 mm/min and a distance between the metal material surface and the distal end of the shear tool of 50 μm. At this time, such measurement is performed on five samples, and the average thereof is defined as the shear adhesive strength. In particular, the shear adhesive strength measured by such a measurement method indicates the adhesive strength when a shear force is applied. The shear adhesive strength is an adhesive strength required in applications to sealing agents and the like where a shear force is applied, and is different from adhesive strength measured in a tensile test. For example, as in Patent Document 1 (JP 2010-274600 A) described above, actually, the shear adhesive strength is not always sufficient even if the adhesive strength measured by the tensile test is relatively high.

The metal-resin laminated body according to the present invention may further include another layer (additional layer) in addition to layers constituted by the above-mentioned metal material and the above-mentioned thermosetting resin. For example, the metal-resin laminated body according to the present invention may include the layers constituted by the above-mentioned metal material and the above-mentioned thermosetting resin, and the additional layer in this order. Examples of such an additional layer include a variety of adherents such as metals, glass, and plastics. The adherent can be in any form, and examples thereof include forms of films, sheets, plates, panels, trays, rods (sticks), boxes, and housings, and the like.

Examples of metals include steel, stainless steel, aluminum, copper, nickel, chromium, alloys thereof, and the like. These can be used in composite materials including a metal plated layer on their surfaces. In this case, the undercoat material for plating is not particularly limited as long as it enables plating, and may be any material such as metals, glass, or plastics.

Examples of glass include alkali glass, non-alkali glass, quartz glass, and the like. Examples of plastics include polyolefin resins such as polyethylene and polypropylene; polyamide resins such as nylon; aromatic polyester resins such as polyethylene terephthalate (PET); acrylic resins such as polyacrylonitrile (PAN); polyvinyl resins such as vinyl acetate (EVA), polyvinyl alcohol (PVA), vinyl alcohol/ethylene copolymers (EVOH), polyvinylidene chloride (PVDC), and polyvinyl chloride (PVC); and the like.

For example, such an additional layer may contain the above-mentioned filler, or may be an additional layer (such as a support) used in lamination on a layer constituted by the thermosetting resin, the resulting layer being laminated on the metal material.

<Method for Manufacturing Metal-Resin Laminated Body>

The metal-resin laminated body according to the present invention can be manufactured by the following method for manufacturing a metal-resin laminated body according to the present invention.

Specifically, the method for manufacturing a metal-resin laminated body according to the present invention is a method for manufacturing a metal-resin laminated body in which a metal material and a thermosetting resin are laminated, the method comprising:

a first step of providing a metal material which has an oxide layer having a thickness of 2 nm or more on a surface thereof and has a center-line average surface roughness Ra of 1.5 nm or more;

a second step of bringing an acid into contact with the metal material provided in the first step; and a third step of bringing a thermosetting resin material into contact with a surface of the metal material brought into contact with the acid in the second step, and curing the thermosetting resin material.

(First Step)

The first step in the manufacturing method according to the present invention is a step of providing a metal material which has an oxide layer having a thickness of 2 nm or more on a surface thereof and has a center-line average surface roughness Ra of 1.5 nm or more.

The metal material which has an oxide layer having a thickness of 2 nm or more on a surface thereof and has a center-line average surface roughness Ra of 1.5 nm or more (hereinafter, referred to as "oxide layer-formed metal material" depending on cases) can be obtained by any method, and examples of a suitable method include a method of causing gas-phase oxidation or liquid-phase oxidation of an untreated metal material not having such an oxide layer and such a center-line average surface roughness Ra. Any commercially available metal material may be used as it is as long as it is a metal material which has an oxide layer having a thickness of 2 nm or more on a surface thereof and has a center-line average surface roughness Ra of 1.5 nm or more.

It is sufficient that the method of causing gas-phase oxidation of the untreated metal material is a method of controlling the thickness of the oxide layer and the center-line average surface roughness Ra within the ranges above by heating the untreated metal material in the air, and is not particularly limited. Examples thereof include a method of heating the untreated metal material in the air using a heating means such as an oven or a hot plate, a method of using heating by irradiation with a laser when the untreated metal material is cut using the laser or the like.

The heating temperature in the method of causing gas-phase oxidation is preferably 80 to 300° C., more preferably 100 to 250° C., still more preferably 150 to 200° C., although not particularly limited. The heating time is preferably 10 seconds to 3 hours, more preferably 30 seconds to 1 hour, still more preferably 60 seconds to 1 hour. In the method of using heating by irradiation with a laser, it is sufficient that the temperature of the metal material heated by laser irradiation falls within the above ranges and the laser irradiation time falls within the above ranges.

Examples of the method of causing liquid-phase oxidation of the untreated metal material include, but should not be limited to, a method of bringing the untreated metal material into contact with a treatment solution containing an oxidizing agent. Examples of the method of bringing the untreated metal material into contact with a treatment solution containing an oxidizing agent include a method of immersing the untreated metal material in a treatment solution containing an oxidizing agent, a method of applying a treatment solution containing an oxidizing agent onto the surface of the untreated metal material.

The oxidizing agent is not particularly limited, and sodium chlorite, sodium hypochlorite, potassium chlorate, perchlorate potassium, or the like can be used, for example. These can be used in the form of an aqueous solution. The treatment solution containing an oxidizing agent may contain a variety of additives (such as phosphoric acid salts such as trisodium phosphate dodecahydrate) and surface actives molecules. Examples of surface-active molecules include porphyrin, porphyrin macrocyclic rings, expanded porphyrins, ring-contracted porphyrins, linear porphyrin polymers, porphyrin sandwich coordination complexes, porphyrin sequences, silane, tetraorgano-silane, aminoethyl-aminopropyl-trimethoxysilane, (3-aminopropyl) trimethoxysilane, (1-[3-(trimethoxysilyl) propyl]urea) ((1-[3-(trimethoxysilyl) propyl]urea)), (3-aminopropyl) triethoxysilane, ((3-glycidyloxypropyl) trimethoxysilane), (3-chloropropyl) trimethoxysilane, (3-glycidyloxypropyl) trimethoxysilane, dimethyldichlorosilane, 3-(trimethoxysilyl) propyl methacrylate, ethyltriacetoxysilane, triethoxy (isobutyl) silane, triethoxy (octyl) silane, tris (2-methoxyethoxy) (vinyl) silane, chlorotrimethylsilane, methyltrichlorosilane, silicon tetrachloride, tetraethoxysilane, phenyltrimethoxysilane, chlorotriethoxysilane, ethylene-trimethoxysilane, amines, sugars, and the like.

Although the method of causing liquid-phase oxidation can be performed under any treatment condition, the solution temperature of the treatment solution containing an oxidizing agent can be set to preferably 40 to 95° ° C., more preferably 45 to 80° C., and the reaction time can be set to preferably 0.5 to 30 minutes, more preferably 1 to 10 minutes.

It is sufficient that the thickness of the oxide layer formed on the surface of the oxide layer-formed metal material, which is provided in the first step, is 2 nm or more. From the viewpoint of stronger adhesion between the metal material and the thermosetting resin in a metal-resin laminated body to be obtained, the thickness is preferably 10 nm or more, more preferably 20 nm or more, particularly preferably 30 nm or more, more particularly preferably 40 nm or more, still more particularly preferably 50 nm or more, and the upper limit thereof is usually 300 nm. It is sufficient that the center-line average surface roughness Ra of the oxide layer-formed metal material provided in the first step is 1.5 nm or more. From the viewpoint of stronger adhesion between the metal material and the thermosetting resin in a metal-resin laminated body to be obtained, it is preferably 2.5 nm or more, more preferably 5 nm or more, and preferably 30 nm or less, more preferably 20 nm or less. It is sufficient that the oxide layer-formed metal material provided in the first step has a center-line average surface roughness Ra within the above ranges. From the viewpoint of stronger adhesion between the metal material and the thermosetting resin in a metal-resin laminated body to be obtained, the ten-point height of irregularities Rz thereof is preferably 2 nm or more, more preferably 40 nm or more, particularly preferably 50 nm or more, and is preferably 150 nm or less, more preferably 100 nm or less.

In the method of measuring the thickness of the oxide layer, using an X-ray photoelectron spectrometer (e.g., product name "JPS-9200S", available from JEOL, Ltd.), a carbon atom (C), an oxygen atom (O), and a metal atom (when the metal material is copper, a copper atom (Cu)) are analyzed to determine the depth of the oxygen atom as the distance (nm) in terms of $SiO_2$. This can be regarded as the thickness of the oxide layer measured.

The center-line average surface roughness Ra and ten-point height of irregularities Rz of the oxide layer-formed metal material can be measured using a scanning probe microscope (e.g., product name "SPM9700", available from SHIMADZU Corporation) by surface observation of the oxide layer-formed metal material in a contact mode in a scan region of a 1 μm square.

When the untreated metal material is subjected to gas-phase oxidation or liquid-phase oxidation in the first step to obtain the oxide layer-formed metal material, the untreated metal material may be degreased before gas-phase oxidation or liquid-phase oxidation. Examples of degreasing methods include alkali degreasing, solvent degreasing, emulsion degreasing, electrolysis degreasing, mechanical degreasing, and the like, and suitable examples thereof include alkali degreasing using sodium hydroxide, potassium hydroxide, or the like, and solvent degreasing using acetone or the like.

Furthermore, the untreated metal material used in the first step usually has an oxide layer formed by spontaneous oxidation. For this reason, when the untreated metal material is subjected to gas-phase oxidation or liquid-phase oxidation in the first step to obtain the oxide layer-formed metal material, the oxide layer formed by spontaneous oxidation may be preliminarily removed before gas-phase oxidation or liquid-phase oxidation is performed, and the untreated metal material from which the oxide layer formed by spontaneous oxidation is removed may be subjected to gas-phase oxidation or liquid-phase oxidation to obtain the oxide layer-formed metal material. Examples of a method of removing the oxide layer formed by spontaneous oxidation include a method of bringing an acid, such as sulfuric acid, hydrochloric acid, or nitric acid, into contact with the surface of the untreated metal material. Preferred is a method of washing (acid washing) the untreated metal material in an aqueous solution containing sulfuric acid, hydrochloric acid, nitric acid, or the like. After such acid washing is performed, degreasing may be performed as needed. Examples of degreasing methods include the methods described above.

(Second Step)

The second step in the manufacturing method according to the present invention is a step of bringing an acid into contact with the oxide layer-formed metal material provided in the first step described above. In the second step, the oxide layer formed on the surface of the oxide layer-formed metal material is removed by bringing an acid into contact with the oxide layer-formed metal material, thereby treating the surface of the metal material.

In particular, the oxide layer-formed metal material provided in the first step has an oxide layer having a thickness of 2 nm or more on a surface thereof and has a center-line average surface roughness Ra of 1.5 nm or more. According to the knowledge of the present inventor, by removing the oxide layer from the oxide layer-formed metal material having such an oxide layer and such a center-line average surface roughness Ra, the metal material surface exposed by this operation has a surface state suitable for adhesion to the thermosetting resin (is appropriately surface roughened).

More specifically, in the second step, the metal material after brought into contact with the acid to undergo the acid treatment (metal material from which the oxide layer is removed) can be surface roughened to have a center-line average surface roughness Ra of preferably 5 nm or more, more preferably 5 to 100 nm, still more preferably 5 to 50 nm, further still more preferably 5 to 30 nm, particularly preferably 8 to 27 nm. In the manufacturing method according to the present invention, by laminating the thermosetting resin on the metal material having such a surface state, a metal-resin laminated body in which the thermosetting resin strongly adheres to the surface of the metal material can be obtained. To be noted, while it is sufficient that the center-line average surface roughness Ra of the metal material after brought into contact with the acid to undergo the acid treatment in the second step falls within the above ranges, the ten-point height of irregularities Rz is preferably 20 nm or more, more preferably 30 to 300 nm, still more preferably 40 to 200 nm, further still more preferably 55 to 180 nm.

The method of bringing the oxide layer-formed metal material into contact with an acid in the second step can be any method as long as it can remove the oxide layer formed on the surface of the oxide layer-formed metal material. Suitable is a method of washing (acid washing) the oxide layer-formed metal material in an aqueous solution containing an acid. Examples of the acid include sulfuric acid, hydrochloric acid, nitric acid, and the like.

The concentration of the acid in the aqueous solution containing the acid used in the acid washing is not particularly limited, and the acid can be used in a concentration enabling removal of the oxide layer without causing corrosion of the metal material. The concentration is preferably 5 to 30% by mass, more preferably 5 to 10% by mass. The temperature (solution temperature) of the aqueous solution containing the acid used in the acid washing is preferably 0 to 60° C., more preferably 20 to 40° C., and the time for the acid washing is preferably 1 to 10 minutes, more preferably 1 to 5 minutes.

When the oxide layer-formed metal material is brought into contact with the acid in the second step, the oxide layer-formed metal material may be degreased before the oxide layer-formed metal material is brought into contact with the acid. Examples of degreasing methods include alkali degreasing, solvent degreasing, emulsion degreasing, electrolysis degreasing, mechanical degreasing, and the like, and suitable examples thereof include alkali degreasing using sodium hydroxide, potassium hydroxide, or the like, and solvent degreasing using acetone or the like.

(Third Step)

The third step in the manufacturing method according to the present invention is a step of bringing a thermosetting resin material into contact with the surface of the metal material brought into contact with the acid in the second step described above, and curing the thermosetting resin material. In the third step, by bringing the thermosetting resin material (resin material before curing for forming the thermosetting resin) into contact with the metal material whose surface is exposed in the second step (hereinafter, referred to as "metal material after the acid treatment" depending on cases), and curing the thermosetting resin material, a metal-resin laminated body in which the metal material and the thermosetting resin (cured product of the thermosetting resin material) are laminated can be obtained.

Any method can be used to bring the thermosetting resin material into contact with the surface of the metal material after the acid treatment and cure the thermosetting resin material. From the viewpoint of productivity, suitable is a method of placing the metal material after the acid treatment in a mold having a desired shape, injecting the thermosetting resin material into the mold containing the metal material after the acid treatment, and thereafter curing the thermosetting resin material.

For example, when the thermosetting resin of the metal-resin laminated body in which the metal material and the thermosetting resin are laminated is constituted by a norbornene-based resin, the above-mentioned polymerizable composition containing a norbornene-based monomer is injected into a mold in which the metal material after the acid treatment is placed, and is cured on the surface of the metal material after the acid treatment through bulk polymerization. Thereby, a metal-resin laminated body in which the metal material and the norbornene-based resin are laminated can be obtained. In this case, unlike the technique disclosed in Patent Document 1, injection of the polymerizable composition into the mold can be performed at room temperature under atmospheric pressure in a simple manner. At this time, the polymerizable composition containing a norbornene-based monomer may be used in the form of two or more preparative liquid formulations, the two or more preparative liquid formulations may be separately introduced into a collision mixing apparatus to be mixed with the mixing head instantaneously, and may be injected into a mold in which the metal material after the acid treatment is placed. When bulk polymerization is performed, heating may be performed as needed.

Alternatively, when the thermosetting resin of the metal-resin laminated body in which the metal material and the thermosetting resin are laminated is constituted by an epoxy resin, a raw material solution for forming the epoxy resin (when two or more raw material solutions are used, a mixture thereof is used) is injected into a mold in which the metal material after the acid treatment is placed, and is cured by heating as needed. Thereby, a metal-resin laminated body in which the metal material and the epoxy resin are laminated can be obtained.

Although the metal material after the acid treatment not substantially having an oxide layer formed on the surface thereof is preferably used in the third step, it may have an oxide layer formed on part or all of the surface thereof. Specifically, by using the metal material after the acid treatment not substantially having an oxide layer formed on the surface thereof, the metal material and the thermosetting resin can be laminated substantially without the oxide layer interposed therebetween, that is, by direct adhesion. When the metal material after the acid treatment having an oxide layer formed on part or all of the surface thereof is used, the oxide layer (oxide layer preferably having a thickness of less than 30 nm, although it varies depending on the type of metal material) can be partially or completely interposed between the metal material and the thermosetting resin.

The additional layer can be laminated as follows: when the above-mentioned method of placing the metal material after the acid treatment in a mold having a desired shape, injecting the thermosetting resin material into the mold in which the metal material after the acid treatment is placed, and curing the thermosetting resin material is used as the method of bringing the thermosetting resin material into contact with the surface of the metal material after the acid treatment and curing the thermosetting resin material, subsequent to the injection of the thermosetting resin material, the above-mentioned adherent is placed on the metal material after the acid treatment with the thermosetting resin material interposed therebetween, and then, the thermosetting resin material is cured. Alternatively, the thermosetting resin material is injected, and is once formed into a semi-cured state (so-called stage B); thereafter, the above-mentioned adherent is placed on the metal material after the acid treatment with the semi-cured thermosetting resin material interposed therebetween, and then the thermosetting resin material is completely cured.

In the metal-resin laminated body according to the present invention thus obtained, the thermosetting resin strongly adheres to the surface of the metal material. More specifically, the metal-resin laminated body according to the present invention has high adhesive strength when a shear force is applied. For this reason, the metal-resin laminated body according to the present invention can be suitably used in broad applications which require integration between the metal material and the resin. In particular, the metal-resin laminated body according to the present invention can achieve high reliability when used in a variety of applications, because the metal material strongly adheres to the thermosetting resin.

EXAMPLES

Hereinafter, the present invention will be described by way of Examples, but these Examples should not be construed as limitations. To be noted, "parts" and "%" are mass-based unless otherwise specified.

<Center-Line Average Surface Roughness Ra, Ten-Point Height of Irregularities Rz>

Using a scanning probe microscope (product name "SPM9700", available from SHIMADZU Corporation), a copper plate having a copper oxide layer (oxide layer-formed metal material) and a copper plate after washing with sulfuric acid (metal material after the acid treatment) were subjected to surface observation and measurement in a contact mode in a scan region of a 1 μm square.

<Thickness of Copper Oxide Layer (Oxide Layer)>

For a copper plate having a copper oxide layer (oxide layer-formed metal material) and a copper plate after washing with sulfuric acid (metal material after the acid treatment), a carbon atom (C), an oxygen atom (O), and a copper atom (Cu) were analyzed using a X-ray photoelectron spectrometer (product name "JPS-9200S", available from JEOL, Ltd.) to determine the depth of the oxygen atom as a distance (nm) in terms of $SiO_2$, and the depth was defined as the thickness of the copper oxide layer (oxide layer).

<Shear Adhesive Strength Between Copper Plate (Metal Material) and Thermosetting Resin>

The shear adhesive strength between a copper plate (metal material) and a thermosetting resin was measured in accordance with SEMI G69-0996. Specifically, the shear adhesive strength of a sample of the metal-resin laminated body was measured using an adhesive strength evaluation apparatus (bondtester) (SS30WD, available from Seishin Trading Co., Ltd.) at a shear rate (rate when a shear is applied by moving a shear tool toward the thermosetting resin) of 0.12 mm/min and a distance between the metal material surface and the distal end of the shear tool of 50 μm. Such measurement was performed on five samples, and the average thereof was defined as the shear adhesive strength.

Example 1

A copper plate (product name "C1100", available from Mitsubishi Materials Corporation) of a 10-mm square having a thickness of 1 mm was acetone degreased by immersing the copper plate in acetone at room temperature for 1 minute, was washed with water using deionized water, and was vacuum dried for 1 minute. In the next step, the copper plate subjected to acetone degreasing was left to stand on a hot plate heated to 190° C., and was oxidized in the air by heating for 1 minute to form a copper oxide layer on the surface thereof. Thus, a copper plate having a copper oxide layer (oxide layer-formed metal material) was obtained. The resulting copper plate having a copper oxide layer (oxide layer-formed metal material) was measured for center-line average surface roughness Ra, ten-point height of irregularities Rz, and thickness of the copper oxide layer (oxide layer) by the methods described above. The results of measurement are shown in Table 1.

The copper plate having a copper oxide layer (oxide layer-formed metal material) was acetone degreased by immersing the copper plate in acetone at room temperature for 1 minute, was washed with water using deionized water, and was vacuum dried for 1 minute. In the next step, the copper plate having a copper oxide layer (oxide layer-formed metal material) subjected to acetone degreasing was alkali degreased by immersing the copper plate at room temperature in a 1% Cica Clean LX-IIII aqueous solution (1% alkali aqueous solution) for 5 minutes, was washed with water using deionized water, and was vacuum dried for 1 minute.

In the next step, the copper plate having a copper oxide layer (oxide layer-formed metal material) subjected to alkali degreasing was washed with sulfuric acid by immersing the copper plate in a 10% sulfuric acid aqueous solution for 5 minutes, thereby removing the copper oxide layer. Then, the copper plate was washed with water using deionized water, and was vacuum dried for 1 minute to obtain a copper plate after washing with sulfuric acid (metal material after the acid treatment). The resulting copper plate after washing with sulfuric acid (metal material after the acid treatment) was measured for center-line average surface roughness Ra, ten-point height of irregularities Rz, and thickness of the copper oxide layer (oxide layer) by the methods described above. The results of measurement are shown in Table 1.

Then, a mold having a shape like a pudding mold having a bottom surface diameter of 3.53 mm, a top surface diameter of 3.00 mm, and a height of 3.00 mm was placed on the copper plate after washing with sulfuric acid (metal material after the acid treatment) obtained above. A polymerizable composition prepared by mixing a monomer solution containing 95.3 parts of an RIM monomer (available from ZEON Corporation), 2.2 parts of dicyclopentadiene monoepoxide (DCPME), 1.7 parts of bicycloheptenylethyltrimethoxysilane, and 0.8 parts of phenoxymethylene glycol methacrylate with a metathesis polymerization catalyst prepared by dissolving 0.03 parts of a ruthenium catalyst (ZhanIN) represented by Formula (7) below, 39.7 parts of 2,6-di-t-butyl-p-cresol (BHT, anti-aging agent), and 30 parts of triphenylphosphine in 30 parts of cyclopentanone in a ratio of the monomer solution to the catalyst solution of 100:3.5 at room temperature was introduced into the mold at normal temperature and normal pressure, and was left to stand at room temperature for 30 minutes, followed by heating in an oven at 200° C. for 1 hour to obtain a metal-resin laminated body of a copper plate (metal material) and a norbornene-based resin including a layer constituted by the norbornene-based resin and having a shape like a pudding mold. Then, using the resulting metal-resin laminated body, the shear adhesive strength between the copper plate (metal material) and the thermosetting resin (norbornene-based resin) was measured by the method described above. The results of measurement are shown in Table 1. The composition of the RIM monomer comprises about 90 parts of dicyclopentadiene and about 10 parts of tricyclopentadiene.

[Chem. 6]

(7)

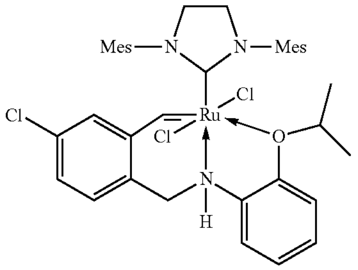

(Where Mes Represents a Mesityl Group.)

Example 2

A copper plate having a copper oxide layer (oxide layer-formed metal material), a copper plate after washing with sulfuric acid (metal material after the acid treatment), and a metal-resin laminated body were obtained in the same manner as in Example 1 except that the heating time in the air using a hot plate heated to 190° C. was changed to 5 minutes, and were evaluated likewise. The results are shown in Table 1.

Example 3

A copper plate having a copper oxide layer (oxide layer-formed metal material), a copper plate after washing with sulfuric acid (metal material after the acid treatment), and a metal-resin laminated body were obtained in the same manner as in Example 1 except that the heating time in the air using a hot plate heated to 190° C. was changed to 60 minutes, and were evaluated likewise. The results are shown in Table 1.

Example 4

A copper plate having a copper oxide layer (oxide layer-formed metal material), a copper plate after washing with sulfuric acid (metal material after the acid treatment), and a metal-resin laminated body were obtained in the same manner as in Example 3 except that an epoxy resin was used as the thermosetting resin material, and were evaluated likewise. The results are shown in Table 1. In Example 4, the epoxy resin used was a product name "jER82S" (available from Mitsubishi Chemical Corporation) as a main agent and "LV11" (available from Mitsubishi Chemical Corporation) as a curing agent. A polymerizable composition prepared by mixing the main agent and the curing agent in a mass ratio of 100:33 at room temperature was injected into the mold at normal temperature and normal pressure, was left to stand at room temperature for 24 hours, followed by heating in an oven at 80° C. for 3 hours to obtain a metal-resin laminated body.

Comparative Example 1

The heating in the air using a hot plate heated to 190° C. and the washing with sulfuric acid were not performed on a copper plate identical to that used in Example 1. Except for that, in the same manner as in Example 1, the acetone degreasing and the alkali washing were performed, and the copper plate having an oxide layer spontaneously formed was used as it was and laminated on the norbornene-based resin to obtain a metal-resin laminated body. The evaluations were performed likewise. The results are shown in Table 1.

Comparative Example 2

A copper plate after washing with sulfuric acid (metal material after the acid treatment) and a metal-resin laminated body were obtained in the same manner as in Example 1 except that the heating in the air using a hot plate heated to 190° C. was not performed on a copper plate identical to that used in Example 1. The evaluations were performed likewise. The results are shown in Table 1.

Comparative Example 3

A copper plate having a copper oxide layer (oxide layer-formed metal material) was obtained in the same manner as in Example 1. After the acetone degreasing and the alkali washing were performed in the same manner as in Example 1, the copper plate having a copper oxide layer formed thereon was used as it was without performing the washing with sulfuric acid, and was laminated on the norbornene-based resin in the same manner as in Example 1 to obtain a metal-resin laminated body. The evaluations were performed likewise. The results are shown in Table 1.

Comparative Example 4

A copper plate having a copper oxide layer (oxide layer-formed metal material) was obtained in the same manner as in Comparative Example 3 except that the heating time in the air using a hot plate heated to 190° C. was changed to 5 minutes. After the acetone degreasing and the alkali washing were performed, the copper plate having a copper oxide layer formed thereon was used as it was without performing the washing with sulfuric acid, and was laminated on the norbornene-based resin to obtain a metal-resin laminated body. The evaluations were performed likewise. The results are shown in Table 1.

Comparative Example 5

A copper plate having a copper oxide layer (oxide layer-formed metal material) was in the same manner as in Comparative Example 3 except that the heating time in the air using a hot plate heated to 190° C. was changed to 60 minutes. After the acetone degreasing and the alkali washing were performed, the copper plate having a copper oxide layer formed thereon was used as it was without performing the washing with sulfuric acid, and was laminated on the norbornene-based resin to obtain a metal-resin laminated body. The evaluations were performed likewise. The results are shown in Table 1.

Comparative Example 6

A copper plate having a copper oxide layer (oxide layer-formed metal material) was obtained in the same manner as in Comparative Example 5 except that an epoxy resin was used as the thermosetting resin material. After the acetone degreasing and the alkali washing were performed, the copper plate having a copper oxide layer formed thereon was used as it was without performing the washing with sulfuric acid, and was laminated on the epoxy resin in the same manner as in Example 4 to obtain a metal-resin laminated body. The evaluations were performed likewise. The results are shown in Table 1.

TABLE 1

| | | | Example | | | | Comparative Example | | | | | |
|---|---|---|---|---|---|---|---|---|---|---|---|---|
| | | | 1 | 2 | 3 | 4 | 1 | 2 | 3 | 4 | 5 | 6 |
| Type of thermosetting resin | | | Norbornene-based monomer | | | Epoxy resin | Norbornene-based monomer | | | | | Epoxy resin |
| Treatment conditions for metal material | Acetone degreasing | (min) | 1 | 1 | 1 | 1 | 1 | 1 | 1 | 1 | 1 | 1 |
| | Gas-phase oxidation (heat treatment at 190° C.) | (min) | 1 | 5 | 60 | 60 | none | none | 1 | 5 | 60 | 60 |
| | Acetone degreasing | (min) | 1 | 1 | 1 | 1 | 1 | 1 | 1 | 1 | 1 | 1 |
| | Alkali washing | (min) | 5 | 5 | 5 | 5 | 5 | 5 | 5 | 5 | 5 | 5 |
| | Washing with sulfuric acid | (min) | 5 | 5 | 5 | 5 | none | 5 | none | none | none | none |
| Oxide layer-formed metal material (after gas-phase oxidation) | Ra | (nm) | 2.7 | 5.8 | 7.9 | 7.9 | 1.3 | 1.3 | 2.7 | 5.8 | 7.9 | 7.9 |
| | Rz | (nm) | 40.0 | 56.4 | 87.4 | 87.4 | 15.3 | 15.3 | 40.0 | 56.4 | 87.4 | 87.4 |
| | Thickness of oxide layer | (nm) | >30 nm | >30 nm | >50 nm | >50 nm | <30 nm | <30 nm | >30 nm | >30 nm | >50 nm | >50 nm |

TABLE 1-continued

| | | | Example | | | | Comparative Example | | | | | |
|---|---|---|---|---|---|---|---|---|---|---|---|---|
| | | | 1 | 2 | 3 | 4 | 1 | 2 | 3 | 4 | 5 | 6 |
| Metal material after acid treatment (after washing with sulfuric acid) | Ra | (nm) | 5.6 | 10.8 | 24.3 | 24.3 | — | 4.1 | — | — | — | — |
| | Rz | (nm) | 45.2 | 64.5 | 166.1 | 166.1 | | 28.5 | | | | |
| | Thickness of oxide layer | (nm) | <20 nm | <20 nm | <20 nm | <20 nm | | <20 nm | | | | |
| Shear adhesive strength | | (MPa) | 10.0 | 22.7 | 30.6 | 19.7 | 3.4 | 5.8 | 3.3 | 5.1 | 6.9 | 2.5 |
| Standard deviation σ of shear adhesive strength | | (MPa) | 3.4 | 1.8 | 2.0 | 4.2 | 4.9 | 2.3 | 2.1 | 2.5 | 2.0 | 2.5 |

Table 1 shows that the present invention provided metal-resin laminated bodies each having a shear adhesive strength between the metal material and the thermosetting resin of 10 MPa or more, in which the thermosetting resin was strongly adhered to the surface of the metal material (Examples 1 to 4).

In particular, the comparison between the results of Example 3 and Comparative Example 5 and those of Example 4 and Comparative Example 6 shows that the shear adhesive strength was more significantly improved when the norbornene-based resin was used as the thermosetting resin than when the epoxy resin was used.

The invention claimed is:

1. A metal-resin laminated body in which a metal material and a thermosetting resin are laminated, wherein the thermosetting resin is a polymer prepared through bulk polymerization of a polymerizable composition containing a norbornene-based monomer. and a shear adhesive strength between the metal material and the thermosetting resin is 10 MPa or more.

2. The metal-resin laminated body according to claim 1, wherein the metal material and the thermosetting resin are laminated by direct adhesion or with an oxide layer interposed therebetween.

3. The metal-resin laminated body according to claim 1, wherein the metal material contains at least one metal selected from the group consisting of copper, nickel, aluminum, chromium, and iron.

4. The metal-resin laminated body according to claim 3, wherein the metal material is copper or a copper alloy.

5. The metal-resin laminated body according to claim 1, further comprising a different layer other than layers constituted by the metal material and the thermosetting resin.

* * * * *